May 5, 1953 V. O. HAUSWIRTH 2,637,158
CUTTER BAR AND MOWER GUARD FOR MOWERS
Filed Sept. 24, 1951
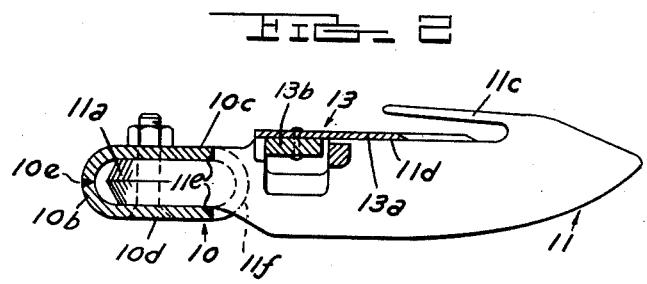
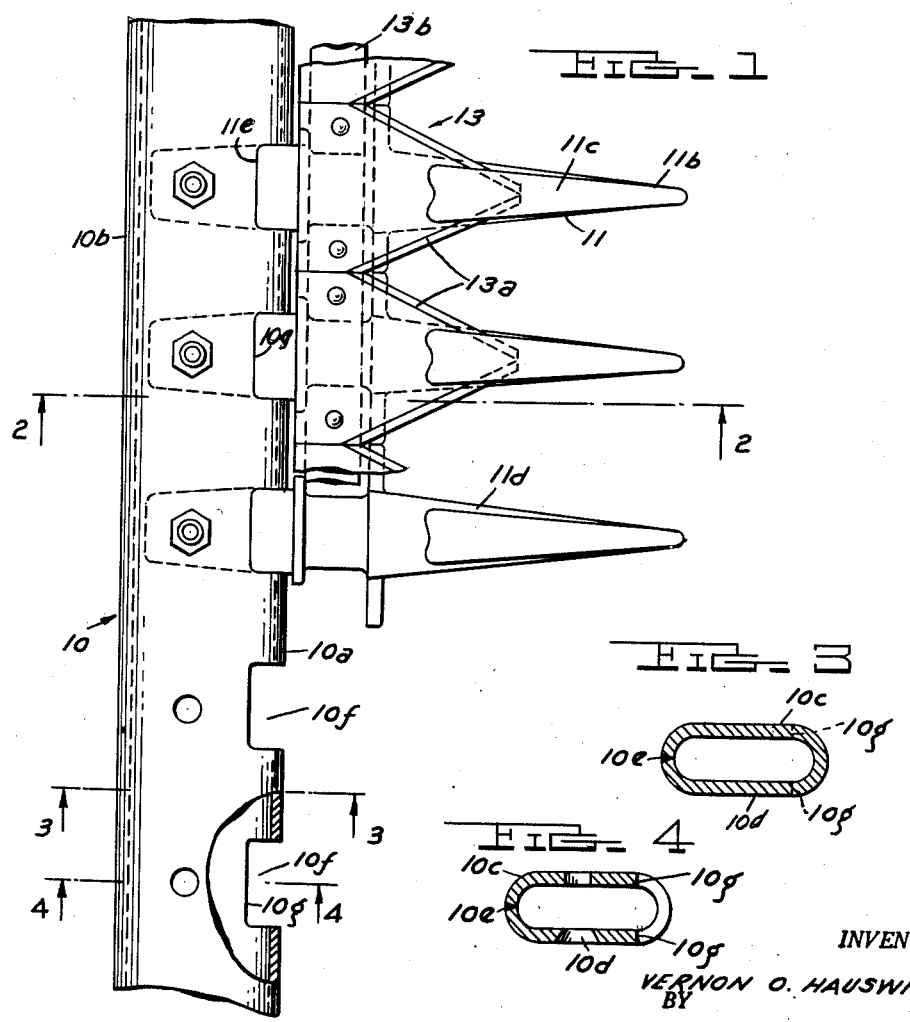
INVENTOR.
VERNON O. HAUSWIRTH
BY
W. A. Schaich
ATTORNEY Patented May 5, 1953

2,637,158

UNITED STATES PATENT OFFICE 2,637,158

CUTTER BAR AND MOWER GUARD FOR MOWERS

Vernon O. Hauswirth, Royal Oak, Mich., assignor to Dearborn Motors Corporation, Birmingham, Mich., a corporation of Delaware Application September 24, 1951, Serial No. 247,951

1 Claim. (Cl. 56—307)

This invention relates to an improved cutter bar and mower guards for mowing machines.

Mowing machines are subject to impact, vibration and other stresses which adversely affect the life and operation of the mower. Unfortunately, little can be done to decrease such adverse effects to the mower because of the conditions under which the mower frequently has to work. Stones and other obstructions in the hay fields or other areas in which the mower is working are hidden and generally the cutter bar of the mower strikes such obstructions before they can be seen. Although release devices are generally provided to permit the cutter bar to swing rearwardly upon encountering an obstruction, some portions of the mower are frequently damaged or broken, especially at the higher tractor speeds now commonly used.

It has been common practice, therefore, to construct the cutter bar from a solid bar, but such construction only adds to the inertia of the bar and aggravates breakage of parts. Furthermore, such a cutter bar sags when extended to a horizontal cutting position due to its inherent lack of cantilever rigidity thereby tending to prevent proper operation of the knife. In addition to such short-comings, mounting of the knife guards on a solid cutter bar has also been far from satisfactory due to the difficulty in securely fastening the knife guards to the cutter bar, while at the same time permitting easy and rapid removal of the guards for replacement.

Accordingly, it is an object of this invention to provide an improved cutter bar for a mower which is of relatively light weight, yet possessing relatively great strength and cantilever rigidity.

Another object of this invention is to provide an improved knife guard for use with a tubular cutter bar which provides a more rigid mounting of the knife guards as well as rapid and convenient replacement of the guard.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary plan view of the improved cutter bar constructed in accordance with this invention showing the improved knife guards mounted on the cutter bar; and Figure 2 is a cross sectional view taken along the plane 2—2 of Figure 1.

Figure 3 is a cross sectional view taken on line 3—3 of Figure 1.

Figure 4 is a cross sectional view taken on line 4—4 of Figure 1.

As shown on the drawings:

In Figure 1 there is shown a portion of a cutter bar 10 constructed in accordance with this invention. The cutter bar 10 is hollow and may be formed from sheet stock blanked to shape and then bent around a mandrel into a substantially oval shaped, cross sectional form, as best shown in Figure 2. The leading and trailing edges 10a and 10b are substantially semi-cylindrical in configuration while the upper and lower surfaces 10c and 10d are respectively flattened into parallel relationship. In forming the cutter bar, the trailing edge 10b has an open joint 10e, formed by bringing the two edges of the blank together, which is closed by welding a bead therealong to integrally join such ends. Thus a one-piece tube is conveniently formed, although other methods, such as extrusion could also be used.

A plurality of vertical slots 10f are provided along the leading edge 10a of cutter bar 10 in longitudinally disposed, evenly spaced relationship. Each slot 10f respectively defines a pair of vertically aligned shoulders 10g in the parallel top and bottom surfaces 10c and 10d. The slots 10f permit convenient mounting of a plurality of knife guards 11 on the cutter bar 10, as will be presently explained.

Knife guards 11 are of substantially conventional construction with the exception of a tang portion 11a provided on their rear ends. Knife guards 11 have the usual forwardly tapering and pointed ends 11b and an integral overhanging projecting member 11c, which is vertically spaced from the body of the mower guard and projects rearwardly from the tip portion thereof. The knife guards shown in the appended drawings have a bed portion 11d which is suitably hardened to serve as a ledger plate, or a separate ledger plate member could be secured thereto as is well known.

Knife guards 11 are respectively provided with integral rearwardly projecting tangs 11a as previously mentioned. At the juncture of tang 11a with the body portion of the knife guard 11, there are respectively provided a pair of vertically aligned shoulders 11e on the upper and lower surfaces of such tang, defined by an enlarged portion 11f arcuately shaped to conform with the curvature of the leading edge 10a of cutter bar 10. Tang 11a is shaped to be snugly insertable through slot 10f and snugly fits between the upper and lower surfaces 10b and 10c of the cutter bar 10. The shoulders 11e abut shoulders 10g while the sides of the enlarged portion 11f snugly fit against the sides of slot 10f. Suitable vertical apertures, respectively provided in cutter bar 10 and tang 11a, permit the insertion of a bolt 12 through such aligned apertures for securing the knife guards 11 to cutter bar 10.

A conventional knife 13 comprising a plurality of knife sections 13a riveted to a knife back 13b is slidably supported by the plurality of knife guards 11, knife sections 13a cooperating in cutting relationship with the ledger surfaces 11d. The usual knife clips (not shown) bolted to cutter bar 10 slidably secure the knife 13 to the cutter bar.

From the foregoing description, it is thus clearly apparent that there is here provided a cutter bar of unique construction which effectively reduces the mass of the cutter bar assembly. The increased rigidity of this cutter bar, particularly to cantilever deformation, coupled with its lighter weight substantially improves the operating life and performance of the mower. The improved knife guard utilized with this improved cutter bar not only permits rapid and convenient assembly of such guards to the cutter bar, but a more rigid assembly is obtainable which does not easily loosen through vibration.

It will, of course, be understood that various details of construction may be varied through a wide range without departing from the principles of this invention and it is, therefore, not the purpose to limit the patent granted hereon otherwise than necessitated by the scope of the appended claim.

I claim:

A cutter bar assembly for a mowing machine comprising, a tubular member having substantially parallel top and bottom walls and adjoining convex leading and trailing edge walls defining a hollow interior, said leading edge wall having a plurality of openings therein disposed in longitudinally spaced relationship, said openings extending laterally inwardly into said top and bottom walls to respectively provide vertically aligned, forwardly facing stop surfaces therein, a plurality of mower guards, a projection on each of said mower guards respectively insertable in said openings, said projections being shaped to fit relatively snugly against the inner surfaces of said parallel top and bottom walls, a peripherally extending abutment shoulder on each of said mower guards adjacent said trailing projection, said shoulder having top and bottom portions arranged to respectively abut said stop surfaces and concave side portions shaped to snugly abut said leading edge when said projection is inserted in said opening, and a bolt vertically traversing said hollow bar and said projection to removably secure said guard to said bar, said abutment shoulder and said projection effectively locking said guard against movement.

VERNON O. HAUSWIRTH.

References Cited in the file of this patent
UNITED STATES PATENTS

| Number | Name | Date |
|---|---|---|
| 262,262 | Vroman | Aug. 8, 1882 |

FOREIGN PATENTS

| Number | Country | Date |
|---|---|---|
| 720 | Great Britain | 1858 |